United States Patent [19]
Miller et al.

[11] Patent Number: 6,031,662
[45] Date of Patent: Feb. 29, 2000

[54] CONVERTIBLE BINOCULAR/STEREOSCOPE DEVICE

[75] Inventors: Jeffrey J. Miller, Orchard Park; Peter F. Reile, South Wales, both of N.Y.; Stephen D. Fantone, Lynnfield, Mass.

[73] Assignee: Fisher - Price, Inc., East Aurora, N.Y.

[21] Appl. No.: 09/019,640

[22] Filed: Feb. 6, 1998

[51] Int. Cl.[7] ............................ G02B 23/02; G02B 27/22
[52] U.S. Cl. ..................... 359/407; 359/412; 359/419; 359/429; 359/431; 359/471
[58] Field of Search ..................... 359/407, 412, 359/419, 429, 431, 466, 471, 473, 482

[56] References Cited

U.S. PATENT DOCUMENTS

| | | |
|---|---|---|
| 198,195 | 12/1877 | Finch ........................................ 359/407 |
| 728,977 | 5/1903 | Rancoule . |
| 1,957,043 | 5/1934 | Harlow . |
| 2,189,285 | 2/1940 | Gruber . |
| 2,394,711 | 2/1946 | Miesegaes . |
| 2,511,334 | 6/1950 | Gruber . |
| 2,537,962 | 1/1951 | Brown . |
| 3,450,480 | 6/1969 | Chitayat . |
| 3,590,498 | 7/1971 | Landzberg . |
| 3,597,041 | 8/1971 | Frantz et al. . |
| 3,888,024 | 6/1975 | Elliott . |
| 3,980,394 | 9/1976 | Zapf . |
| 4,013,340 | 3/1977 | Mukai et al. . |
| 4,021,940 | 5/1977 | Saint . |
| 4,480,893 | 11/1984 | Fantone . |
| 4,526,444 | 7/1985 | Fantone et al. . |
| 4,545,655 | 10/1985 | Fantone et al. . |
| 4,561,723 | 12/1985 | Hamano et al. . |
| 4,659,194 | 4/1987 | Swartz . |
| 4,726,653 | 2/1988 | Thaler et al. . |
| 4,786,154 | 11/1988 | Fantone et al. . |
| 4,786,155 | 11/1988 | Fantone et al. . |
| 4,971,429 | 11/1990 | Ishido et al. . |
| 5,017,952 | 5/1991 | Wheeler . |
| 5,191,471 | 3/1993 | Funathu . |
| 5,469,293 | 11/1995 | Fantone . |
| 5,579,158 | 11/1996 | Padula . |
| 5,581,399 | 12/1996 | Abe . |
| 5,589,978 | 12/1996 | Fantone . |
| 5,633,753 | 5/1997 | Fantone et al. . |
| 5,640,271 | 6/1997 | Nishitani et al. . |

*Primary Examiner*—Jon Henry
*Attorney, Agent, or Firm*—Akin, Gump, Strauss, Hauer & Feld, L.L.P.

[57] ABSTRACT

A dual purpose optical device that is convertible between binocular and stereoscope modes of operation while using a common eyepiece arrangement for both. The device includes a housing containing a pair of optic supports mounted side-by-side for lateral movement towards and away from one another. Each support preferably carries three lenses. Two lenses on each support serve as the eyepiece and are aligned in a common plane with an eyepiece opening through the housing and a rotatable mirror assembly. The assembly pivots substantially ninety degrees from opposing forty-five degree angle positions with respect to the plane through the eyepiece opening and the eye and field lenses so as to fold the lines of sight either up or down within the housing. A circular photo transparency reel is received horizontally in a slot provided on an upper side of the housing. Each optic support is provided with three fixed mirrors which fold the lines of sight directed downward by the rotating mirror through an objective lens located at an opposite end of the housing. The three lenses on each optic support collectively form a binocular lens train while two of the lenses of each set form a magnifying lens train. A spring biases the optic supports together and against tapered, longitudinally extending sides of a cam mounted for longitudinal movement in the housing. A wheel projects partially through the bottom of the housing and supports pinions that are engaged with racks on the cam to provide manual interpupillary spacing adjustment of the optic supports. In the stereosope mode of operation, the interpupillary distance between the eyepieces is automatically set in response to converting between the two modes so that it matches the distance separating corresponding stereo pairs.

15 Claims, 6 Drawing Sheets

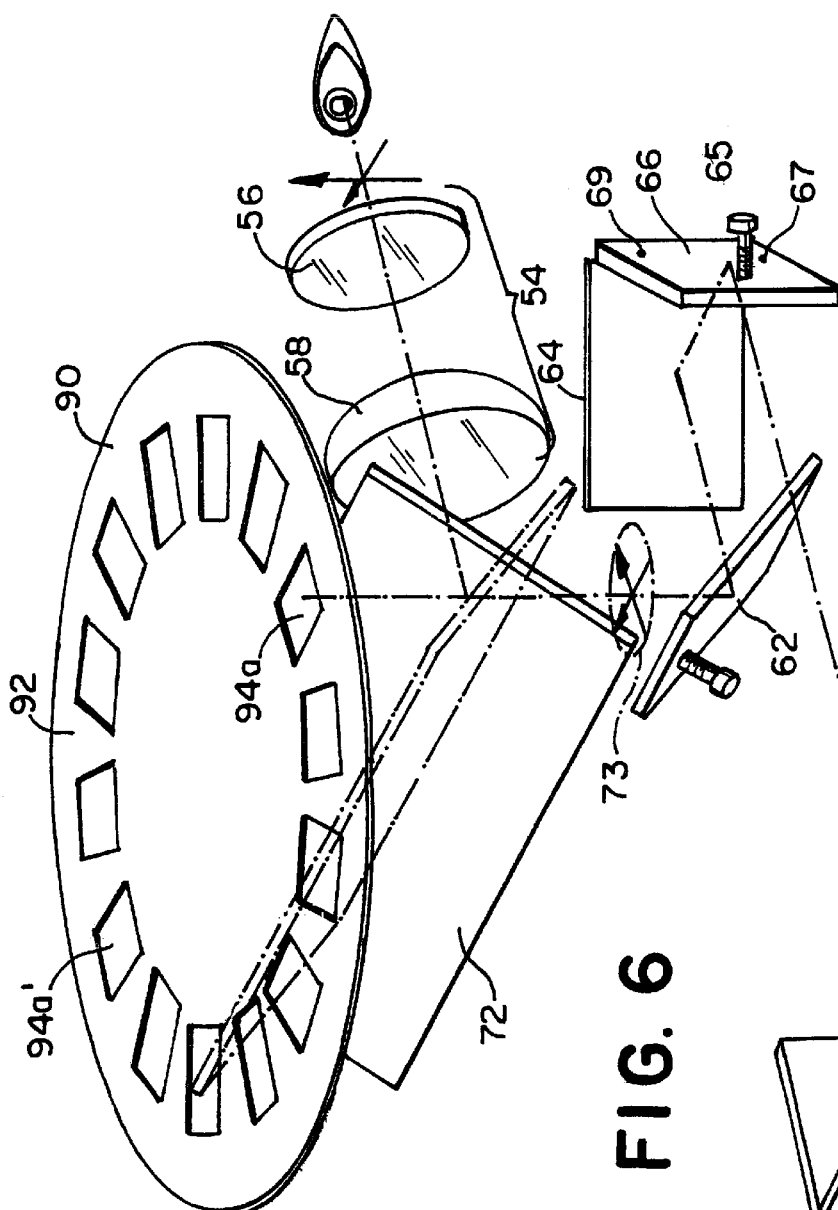
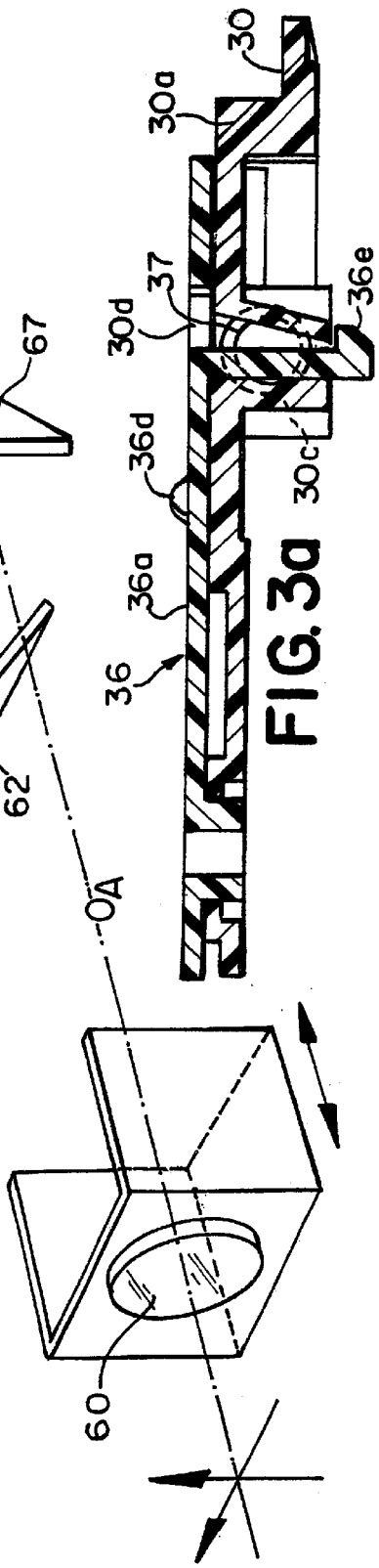

CONVERTIBLE BINOCULAR/STEREOSCOPE DEVICE

BACKGROUND OF THE INVENTION

This invention in general relates to optical viewing devices and in particular to a dual purpose optical device that is convertible between one mode of operation in which it serves as binoculars and another mode of operation in which it is a stereoscope.

Stereoscopic viewers, or stereoscopes, and binoculars are well known. One very popular type of stereoscope has long been provided under the name ViewMaster®. The View-Master® device has a housing that includes a roughly square, relatively thin, main body with a pair of elongated hollow tubes projecting from one end face. The main body is provided with an open slot along its top side to vertically receive a circular reel carrying stereo pair images. Each reel is a card that contains fourteen, color photographic transparencies arranged as seven opposing stereoscopic pairs. The subject of each pair is taken from two slightly different viewing perspectives so that, when the pairs are simultaneously viewed through the viewer, a stereoscopic (3-D) effect is provided. To view the stereo pairs, eyepieces are placed in apertures at the ends of the elongated hollow tubes. An advance lever is provided in the main portion of the body partially overlapping the reel and partially projecting from the body to form a handle. The reel can be advanced in the main body by movement and release of the handle. The end face of the main body opposite the end face supporting the eyepieces is normally provided with two translucent covers (or a single large translucent cover) which are in line with eye openings in the eyepieces and pairs of windows provided through the advance lever and through the opposing end face of the housing. The windows permit back lighting of the photographic transparencies for viewing through the eyepieces. Further details regarding the original View-Master® stereoscopic viewers can be found in U. S. Pat. No. 2,511,334, which is incorporated by reference herein in its entirety.

View-Master® stereoscopes have long been valued as both toys and educational devices. These viewers have been widely available and have been providing color images to both children and adults long before color television became common. They still provide three-dimensional images with a realism that cannot be achieved with any other consumer-available technology.

As valuable as such viewers are, it would be desirable to both improve the performance of such devices and to otherwise make such viewers more versatile to enhance their entertainment value, their educational value, or both.

BRIEF SUMMARY OF THE INVENTION

In one aspect, the invention is a convertible binocular/stereoscope device comprising: a housing; two sets of lenses within the housing, each set including a plurality of lenses spaced and arranged to form two, side-by-side lens trains extending longitudinally between opposite ends of the housing; a pair of eye openings through the housing at one of the two opposite ends, each eye opening adjoining and being aligned with a lens of a separate one of the two sets of lenses, the pair of eye openings collectively providing two lines of sight into the housing and through the two sets of lenses; and a mirror assembly in the housing movably supported to permit selective deflection of the line of sight from each eye opening away from the lenses of each set longitudinally downstream from the mirror assembly and to a pair of viewing locations on a side of the housing located longitudinally between the opposite ends.

In another aspect, the invention is an optical device with adjustable, interpupillary spacing comprising; a pair of optic supports, each support supporting a plurality of lenses, the pair of optic supports being positioned side-by-side for lateral movement towards and away from one another; a cam movably mounted between the two optic supports, sides of the cam being in respective contact with the two optic supports and spacing between the sides of the cam in contact with the optic supports varying progressively along the cam; and a manual actuator operably coupled with the cam so as to move the cam between the two optic supports and thereby adjust lateral spacing between the two optic supports. The optic supports are resiliently biased toward one another so that they are always positively loaded against the cam surfaces.

In yet a third aspect, the invention is a stereoscope comprising: a housing; a first pair of lenses positioned side-by-side in the housing; a pair of eye openings through a viewing side of the housing, each eye opening adjoining and being aligned with a separate one of the first pair of lenses to provide separate, side-by-side lines of sight straight through the first pair of lenses; a reel advance lever mounted to pivot on another side of the housing adjoining the viewing side between first and second positions, the reel advance lever having a pair of window openings therethrough aligned with and overlapping one another in the first position of the reel advance lever; and means for folding the lines of sight downstream from the first pair of lenses through the window openings of the housing and the reel advance lever.

In yet a fourth aspect, the invention is an optical device convertible between binocular and stereoscope modes of operation, said optical device comprising: objective lens means for forming a pair of laterally separated real, intermediate images of an object at predetermined distances behind said objective lens means corresponding to left and right eye binocular views; a pair of eyepieces of net positive power for viewing said intermediate images at said predetermined distances; means for providing viewing locations for a stereoscopic pair of images at a predetermined location with respect to said eyepieces, said predetermined location corresponding to the distance between said eyepieces and said intermediate images; and a plurality of mirrors located between said objective lens means and said eyepieces for inverting and reverting the orientation of said intermediate images from said objective lens means so that said intermediate images appear properly oriented when viewed by said eyepieces and for redirecting the line of sight through said eyepieces so that an observer can selectively view said intermediate images and said stereo pairs.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 3a is an elevational cross section taken along the lines 3a—3a in FIG. 3.

FIG. 6 is a diagrammatic perspective view showing the various optical elements of one side of the optical trains of the device along with the rotatable mirror and the circular reel.

DETAILED DESCRIPTION OF THE INVENTION

Figure 1:
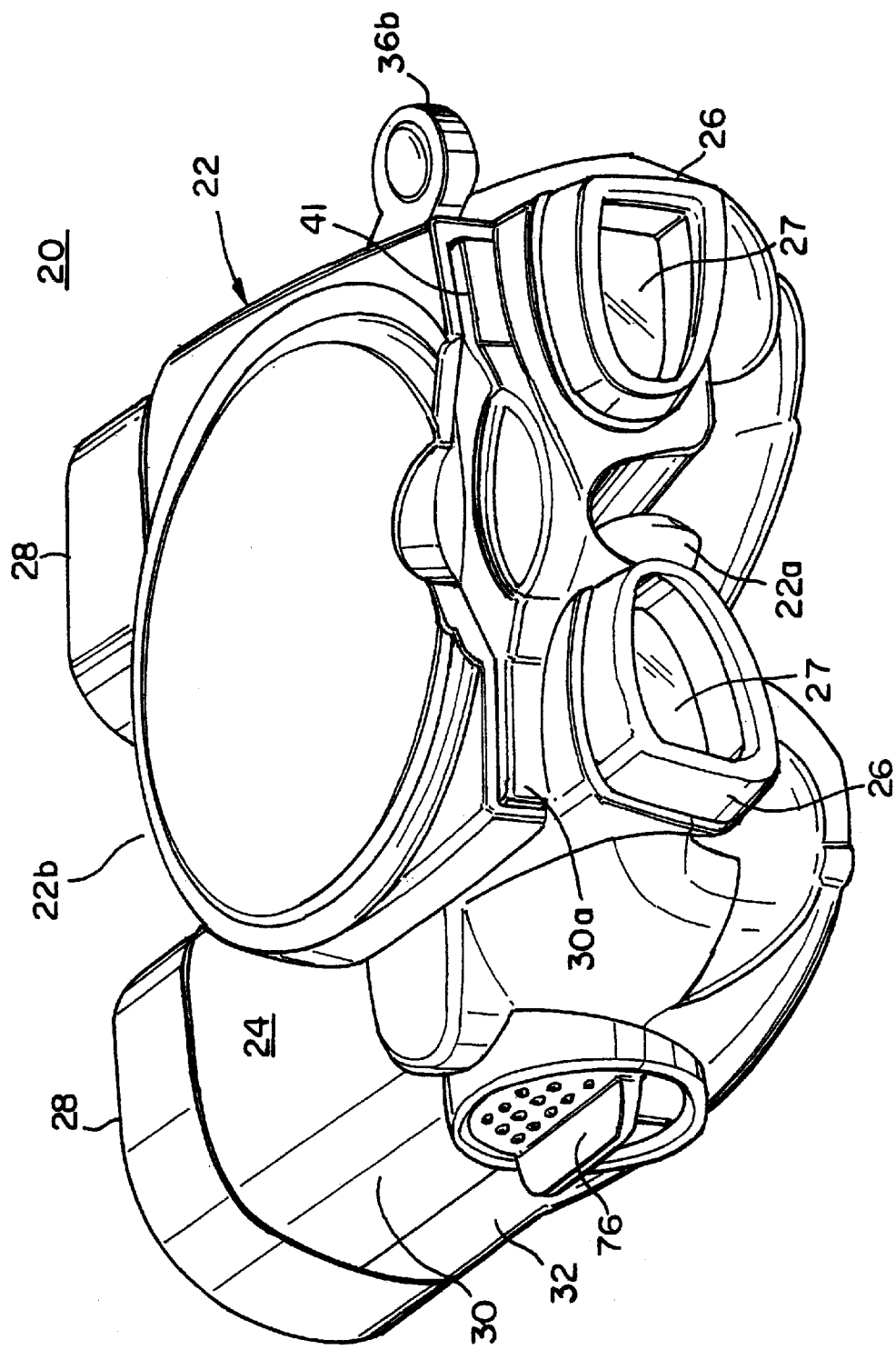
FIG. 1 is a perspective view of a convertible binocular/stereoscope device of the present invention.

In the drawings, like numerals are used to indicate like elements throughout. Referring to FIG. 1, the convertible binocular/stereoscope device of the present invention is indicated generally at 20. The device 20 includes a housing indicated generally at 22. The housing 22 includes a main body portion indicated generally at 24. A pair of eyepiece end caps indicated generally at 26 are provided on one end face of the main body portion 24 and define a viewing side or end 22a of the housing 22. A pair of tubular objective end caps 28 are provided on an opposite, "objective" side or end 22b of the housing 22.

Figure 2:
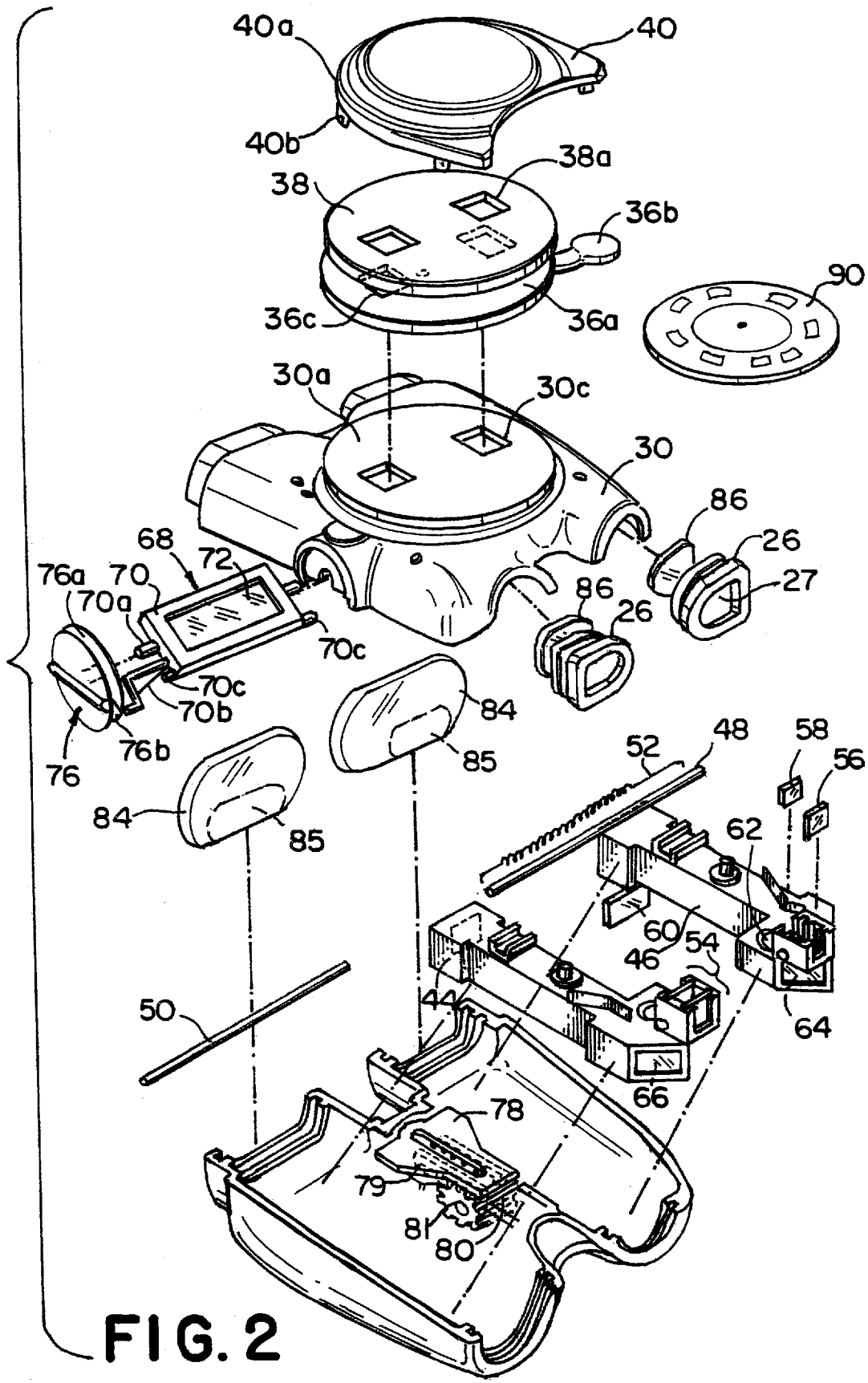
FIG. 2 is an exploded perspective view of the operative elements of the device of FIG. 1 together with a circular reel with which the device is used.

Referring to the exploded view of the device 20 in FIG. 2, housing 22 is provided mainly by an upper shell 30, and a lower shell 32, which preferably mates edge to edge with the upper shell 30. The shells 30, 32 collectively define a parallel pair of eyepiece tubes at the viewing end 22a which receive the pair of eyepiece end caps 26 and a parallel pair of objective tubes which receive the objective end caps 28. The upper surface of the upper shell 30 is provided with an enlarged, raised, generally circular boss 30a. A pair of rectangular windows 30c are provided through the upper shell 30 at spaced apart, generally symmetric positions on opposite sides of the center of the circular boss 30a. An advance lever 36 is rotatably positioned over the circular boss 30a. The advance lever 36a includes a generally circular main portion 36a and an arm 36b projecting from one side of the circular perimeter of the main portion 36a. An anti-rotation member 38 is positioned over the advance lever 36 and is supported by and held stationary on a cover 40. The cover 40 preferably has a circumferential skirt 40a that extends downwardly around approximately three-quarters of the anti-rotation member 38, the advance lever 36 and the side the circular boss 30. The cover 40 is configured to define a slot 41 (see FIG. 1) on the viewing side of the boss 30a. The slot 41 is configured (i.e., sized and shaped) to receive a circular reel 90 between the anti-rotation member 38 and the advance lever 36. The cover 40 is preferably provided with "feet" 40b at the lower end of the skirt 40a, which can be engaged to upper shell 30 in a suitable manner, for example, by staking through openings in the upper shell 30. Stakes or other suitable structures can be provided on the anti-rotation member 38, the cover 40 or both to surround and rotatably retain the advance lever 36 within the cover 40. Alternatively or in addition, the advance lever 38 can be pivotally secured to the upper shell 30 by suitable means such as a fastener (screw or rivet) through the center of the lever 38 and boss 30a or by means of a pivot pin 36 integral with the main portion 36a of the advance lever received in an appropriate opening in the upper shell 30 (see FIG. 3a).

Figure 3:
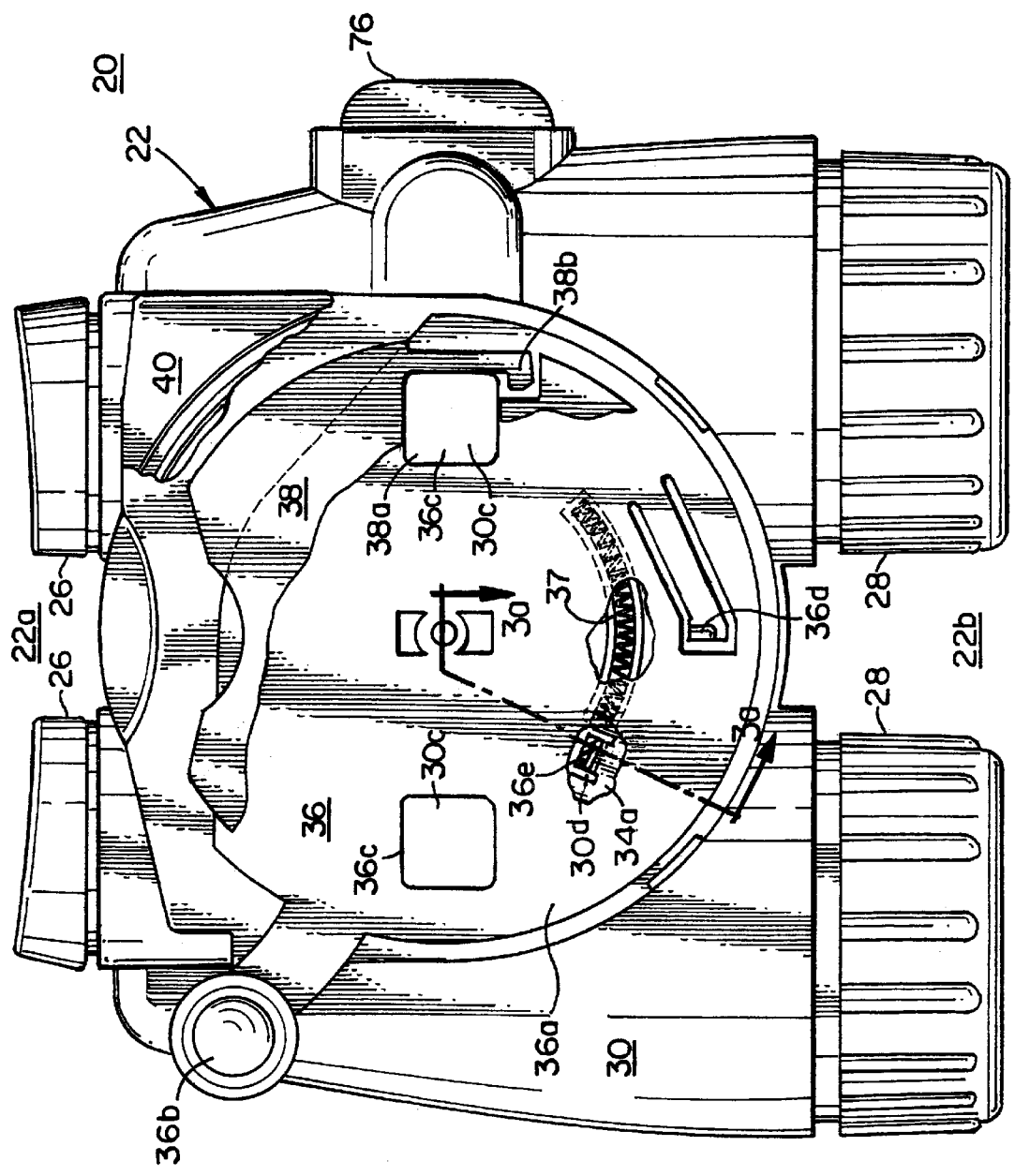
FIG. 3 is a broken away top plan view of the device.

Referring to FIGS. 2 and 3, the main body 36a of advance lever 36 includes a pair of spaced apart mirror image window openings 36c, one of which is visible in FIG. 3, and a reel engagement finger 36d. The free tip of finger 36d projects transversely away from a plane defined by the remainder of the circular main portion 36a of the lever 36 to engage, in a conventional manner, one of the slots provided around the periphery of each reel 90. Anti-rotation member 38 has a generally circular shape preferably with a pair of spaced apart, mirror image rectangular window openings, one of which is indicated at 38a, and the outer edges of which are defined by spring fingers 38b. These fingers are adapted by size, location and form to bear against and releasably engage a reel 90 inserted between the advance lever 36 and anti-rotation member 38 while the advance lever 36 rotates without moving the reel 90. The finger 36d can be defined to advance the reel 90 in either one of the two movement directions of the advance lever 36.

Referring to FIGS. 3 and 3a, an arcuate recess 30b is provided in the circular boss 30a, which receives a return spring 37. The advance lever 36 includes a finger 36e which extends transversely from the plane of the main portion 36a through a slot opening 30d through the upper shell 30. Slot opening 30d extends through one end of the recess 30c and through the bottom wall of the recess 30c along the recess. Slot opening 30d permits finger 36c to pass through the recess 30c when the advance lever 36 is rotated thereby compressing return spring 37. The advance lever 36 is biased by spring 37 to an initial position in which the pair of rectangular windows 36c through the advance lever 36 are aligned with and fully overlap the pair of rectangular windows 38a of the anti-rotation member 38 and the pair of rectangular windows 30c through the upper shell 30 of the housing 22. The cover 40 is preferably uniformly transparent or at least translucent directly over the window openings. As will become more readily apparent hereinafter, this image advance arrangement assures proper sequencing of image pairs where sequence dependent story lines are to be provided by way of the image scripting.

Figure 4:
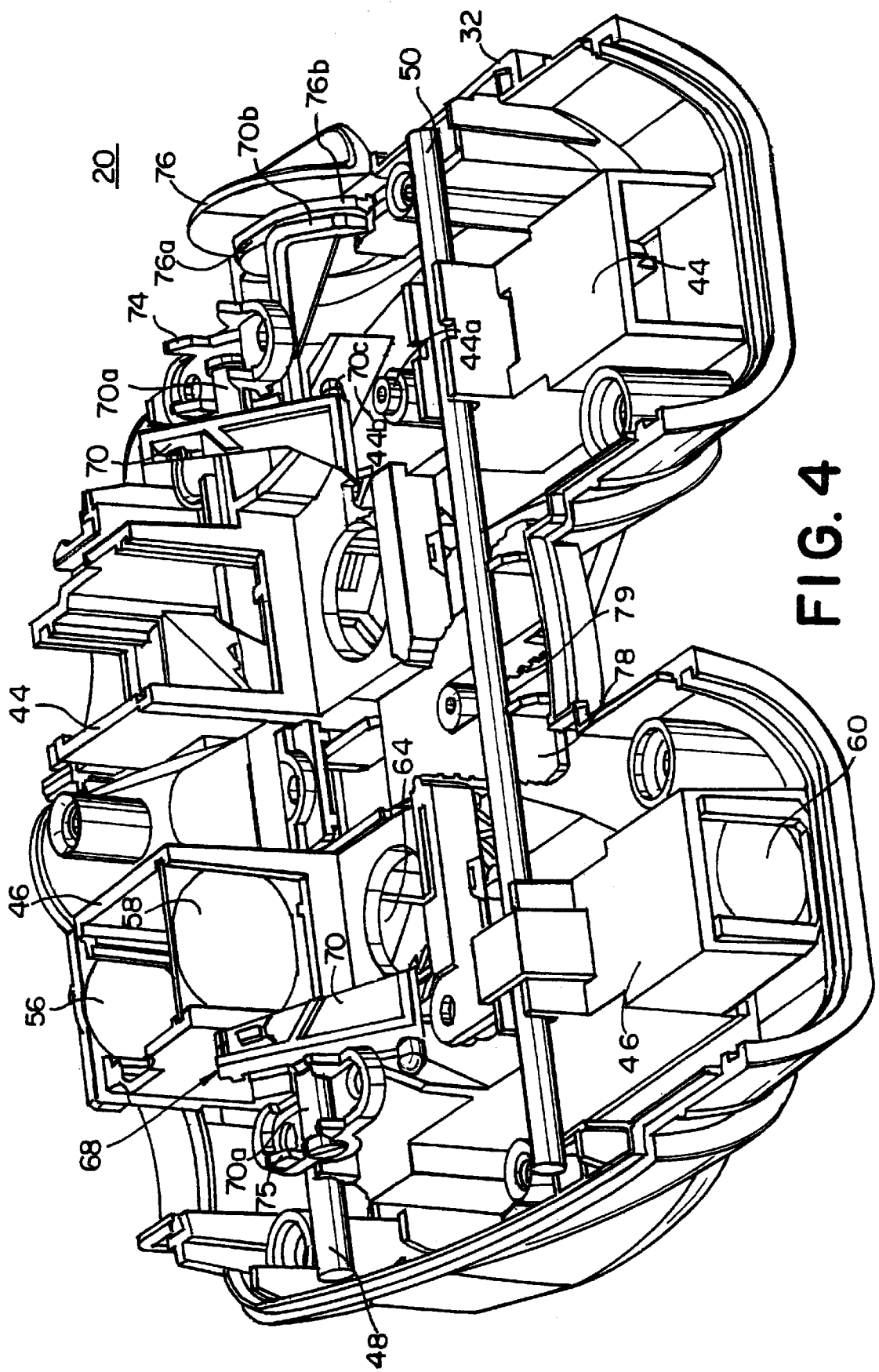
FIG. 4 is a perspective view of the device from the objective end with the upper shell of the housing and selected individual components removed for clarity.
Figure 5:
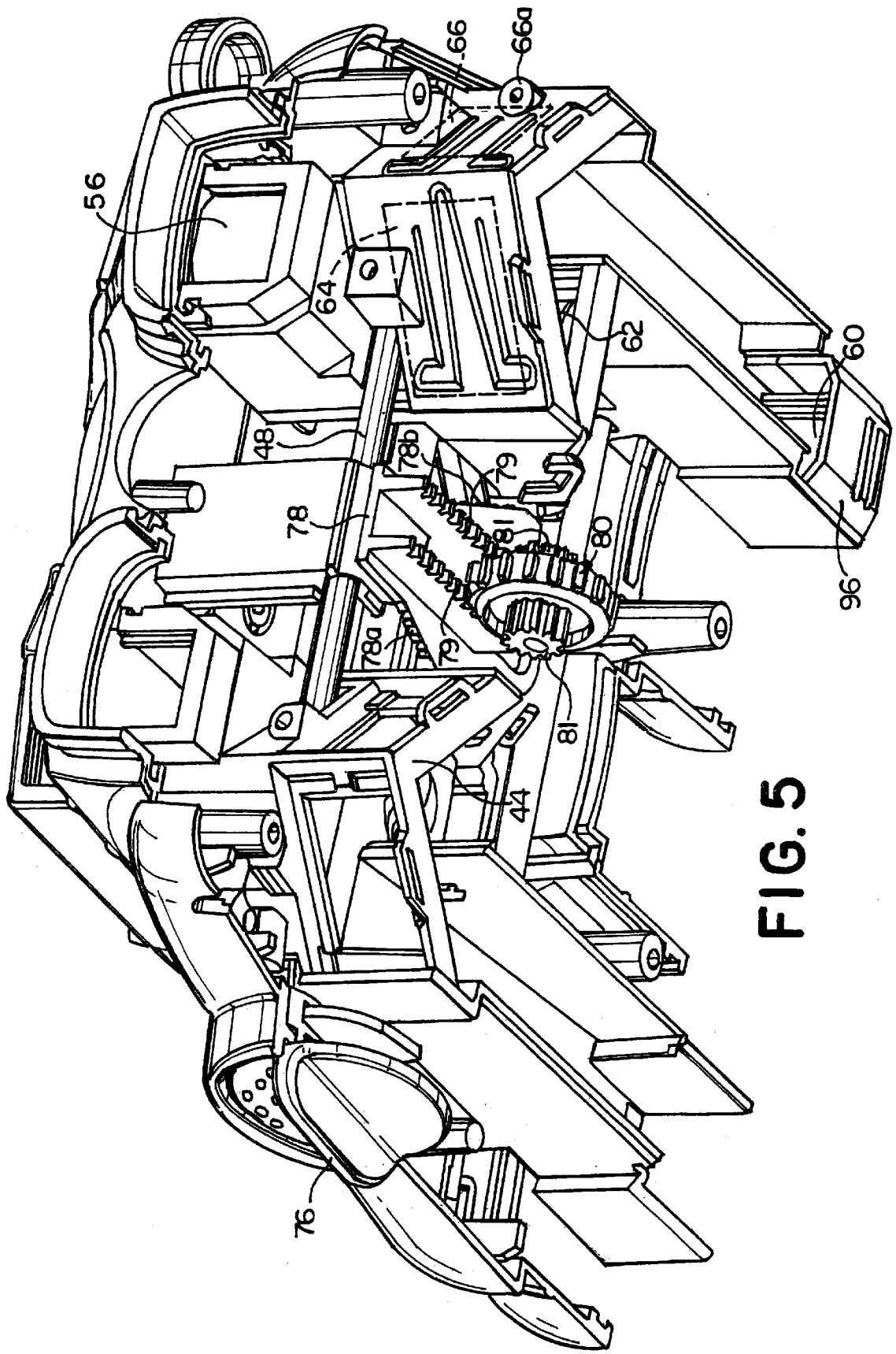
FIG. 5 is a perspective view of the device from the eyepiece and with the lower shell of the housing and selected individual components removed for clarity.

Referring to FIGS. 2, 4 and 5, a pair of preferably mirror-image optic supports 44, 46 are mounted side-by-side in the housing 22 for lateral movement towards and away from one another on a pair of spaced apart parallel rods 48 and 50, ends of which are trapped between the shells 30, 32. The optic supports 44, 46 are preferably biased together by suitable means such as a coiled tension spring 52 engaged with each support for example on bosses 44a, 46a. Each of the optical supports 44, 46 preferably mounts and supports an identical set of lenses. Referring to FIGS. 2 and 6, each set is preferably provided by an eye lens 56, a field lens 58, which are fixed with respect to one another and define a positive magnifying eyepiece indicated generally at 54 in FIG. 2, and an objective lens 60 (individually numbered on the right support 46 in FIG. 2). Lenses 56, 58 and 60 are also visible in the right optic support 46 in FIGS. 4 and 5 while such lenses are removed from the remaining optic support 44 in each FIGS. 4 and 5 to provide clarity to other details. The eye and field lenses 56, 58 forming eyepiece 54 and objective lens 60 of each set collectively form a telescopic lens train. That is, the lenses 56, 58, 60 are suitably operably aligned and spaced so that they collectively provide a magnified image of a distant object in front of the objective end 22b of the device 20 at the eye opening 27 through each eyepiece end cap 26 which adjoins and is aligned with the eye lens 56 of one set when the device is in its binocular mode of operation. The two telescopic trains of the two optic supports 44, 46 thus extend side-by-side between the opposing ends 22a, 22b of housing 22. The eye and field lens 56, 58 of each set collectively define a magnifying lens train when the device 20 is in its stereoscope mode of operation. That is, they collectively magnify any visual image falling on the field lens 58, whether from the objective lens 60 or from the stacked window openings 30c, 36c and 38a. Finally, each optic support 44, 46 mounts three planar mirrors which are numbered at 62, 64 and 66 on the various optic supports 44 and 46 in FIG. 2 and shown together in FIG. 6. Again, mirrors 62, 64 and 66 are mounted in the right optic support 46 in FIGS. 4 and 5 and removed from the left support 44.

The optical components of the viewer 20 further include a movable mirror preferably in the form of an elongated, rotatable or "flip" mirror assembly 68. The assembly 68 preferably includes a rotatable mirror support 70 with preferably a single elongated plane mirror(s) 72 mounted on the support 70. A pair of identical mirrors could be used. The rotatable mirror assembly 68 and its mirror(s) 72 are mounted transversely within the housing 22 and are located longitudinally within the housing between the field and objective lenses 58, 60 of each lens set. The rotatable mirror assembly 68 includes a pair of identical pins 70a at opposing longitudinal ends of the support 70, which are rotatably received in pillow blocks 74, 75 provided in opposite lateral sides of the housing upper shell 30. A lever arm 70b extends from one side of support 70 while cam pins 70c project outwardly from opposing lower sides of support 70. Their uses will be explained later.

The assembly 68 and its mirror(s) 72 are movably supported in the housing to permit selective movement of the assembly and mirror(s) and deflection of the line of sight from each eye opening 27 away from the objective lenses 60 downstream from the movable assembly 68 and its mirror(s) 72 through the viewing locations provided by the stacked window openings 30c, 36c, 38a in the upper side wall of the housing 22, which locations are located longitudinally between the opposite ends 22a, 22b of the housing. The rotatable mirror assembly 68 is mounted within the housing so as to rotate its mirror(s) 72 preferably through a substantially ninety degree arc, centered about the lines of sight through the eyepiece openings 27 and the eye and field lenses 56, 58, between a first position angled approximately 45° with respect to a horizontal plane through the device 20 and a second position rotated 90° from the first position and angled at an opposing 45° angle to the horizontal plane. The orientation of the horizontal plane may be defined in various ways. Optically, the horizontal plane is preferably defined by the centers of eye and field lenses 56, 58 of both sets and both eye openings 27. In a first position corresponding to the stereoscope mode of operation, shown in phantom in FIG. 6 (and indicated generally in FIG. 2), the mirror(s) 72 of the assembly 68 intersect and deflect the lines of sight from the eye openings 27, and the eye and field lenses 56, 58 of both lens sets substantially ninety degrees upwardly within the housing 22 and through the rectangular windows 30c, 36c, and 38a and the cover 40. In the second position corresponding to the binocular mode of operation shown 25 in solid in FIG. 6 (and seen in FIG. 4), the mirror 72 of the flip mirror assembly 68 intersects and deflects the parallel lines of sight through the eye openings 27 and lenses 56, 58 of each lens set approximately 90° downward to the surface of the first (inversion) mirror 62 on the respective optic supports 44, 46. From there, lines of sight are reflected back to the second and third (reversion) mirrors 64, 66, which are arranged at substantially 90° angles to one another and at 45° angles to line of sight being reflected by the first mirror 62. The third mirror 66 is oriented to reflect the line of sight through the center of the objective lens 60 on the respective optic support 44, 46.

A manual actuator for the rotatable mirror assembly 68 is preferably provided in the form of a knob 76 on one side of the housing 22. Preferably, knob 76 is rotatably trapped between the shells 30 and 32. Knob 76 is engaged with the support 70 in a manner which permits rotation of the support 70 by the knob 76. In the depicted embodiment, the knob 76 has an inner circular wall 76a with a radial slot 76b that receives the end of lever arm 70b extending from mirror support 70. The mirror support 70 is preferably positioned and sufficiently large to block, as much as possible, light entering the housing 22 through the openings at the objective end 22b and to prevent that light from passing directly through the device 20 into the field and eye lenses 58, 56 so as to keep the interior of the housing 22 between the assembly 68 and those lenses as dark as possible to enhance viewing conditions for the user. Thus, the assembly 68 also acts as an interior shade or sun screen.

The remaining operating components of the device 20 include a cam plate or simply cam 78, which is positioned within the housing 22 for longitudinal movement between the optic supports 44, 46, and a manual actuator in the form of a wheel 80, which is mounted for rotation in the housing to extend partially through an opening 32a through the lower shell 32 of the housing. Wheel 80 is operably coupled with the cam 78 so as to move the cam 78 longitudinally between the two optic supports 44, 46 to adjust lateral spacing between the supports and thus the interpupillary spacing between the two eyepieces of the device. At least one, and preferably a pair of pinions 81 are provided on opposite sides of the wheel 80 and operatively engage with at least one and preferably a pair of racks 79, provided in parallel on the lower side of the cam 78. Spring 52 (FIG. 2) biases corners of the optic supports 44, 46 into contact with opposing, sloping or tapered, longitudinally extending sides 78a, 78b of the cam 78. Spacing between the sides 78a, 78b varies progressively along the length of the cam 78. As the cam 78 is moved longitudinally in the housing 22 between the optic supports 44, 46, the tapering sides 78a, 78b either force the optic supports 44, 46 laterally apart or permit them to come together under the bias of spring 52, thereby adjusting lateral spacing between the two optic supports 44, 46. If desired, parallel serrations or steps can be provided along the sides 78a, 78b as indicated in FIG. 5 to provide discrete rather than continuous interpupillary spacing adjustment.

Device 20 also may also be provided with a pair of preferably identical objective windows 84 and a pair of preferably identical eye windows 86, which may be mounted in various ways. Preferably the windows 84, 86 are received in grooves in the upper and lower shells 30, 32. The eyepiece end caps 26 hold the viewing ends of the upper and lower shells 30, 32 together. The objective end caps 28 perform a similar function with respect to the opposite, objective ends of the upper and lower shells 30, 32. If the objective windows 84 are much larger than they need to be for functional purposes (i.e., to pass light to the objective lenses 60), then the non-functional areas of the windows 84 may be provided with opaque masks to help keep the interior of the housing 22 dark to improve viewing conditions. For example, broken lines 85 on windows 84 identify the elongated fields of view of the lens sets on the movable optic supports.

Referring now to FIG. 6, it can be seen that the optical device 20 comprises two adjacent sets of three refractive optical elements (56, 58 and 60) arranged, respectively, along alternate optical paths that are folded via plane mirrors (62, 64, 66, 72) one or more times depending on the device mode of operation and the image orientation functions required while in either the binocular or stereoscope mode. In the binocular mode of operation, the optical path is multiply folded between an observer's eyes and image space, and comprises positive meniscus lens 60 that serves as the binocular mode objective and operates to form an intermediate image at a field stop 73 located between folding mirror 72 and inversion mirror 62, a two-element eyepiece (56, 58) that permits an observer to view the intermediate image, and four plane mirrors (one being the surface of the rotatable mirror 72) that operate to provide proper image orientation. Each of the eyepieces 54 themselves comprise a pair of spaced apart positive lenses 56, 58 with one field lens 58 being relatively thick to provide enhanced aberration control and field lens functions.

In the stereoscope mode of operation, the eyepieces operate to allow the observer to view the stereo phototransparency pairs 94a, 94a' carried on the reels 90 (see FIG. 6). To accomplish this, the interocular or interpupillary spacing between the eyepieces 54 is automatically set in response to manually actuating the rotatable mirror 72 to be nominally the same as the distance separating corresponding stereo pairs on the circular reel 90 while the axial distance separating the eyepiece from the respective stereo pairs is set to be the same as that between the eyepieces and the location of the intermediate image formed by the binocular objectives 60. This automatic setting of interpupillary distance is achieved by a camming arrangement that overrides the interpupillary adjustment feature previously described to separate the lens assemblies to the extreme of their outermost travel. Pins 70c on the lower corners of the mirror support 70 contact and rub across cam walls 44b, 46b provided on the upper sides of the optic supports (see FIGS. 2 and 4). Cam walls 44b, 46b are configured such that the optic supports are moved away from one another to their widest position, which corresponds to the spacing between the stereo phototransparency pairs (e.g., 94a, 94a' in FIG. 6) on the reel 90. One surface of the pivoting mirror 72 serves to invert the image from the stereo pairs 94a, 94a' which themselves need to "flipped" over compared with how you would see them when viewing them directly with normal image orientation.

The following tabular constructional represents an example of a design prescription for the optical device of the invention. In the binocular mode of operation, the magnification is slightly higher than 4.0× while the angular field of view is 5.5 degrees for the full field. The overall length of the system is 247.64 mm, and the eye relief, the distance from the eye pupil to the last surface of the eyepiece is 25.67 mm. The refractive elements are all of acrylic with an index of refraction of 1.491757 and a reciprocal relative dispersion (Abbe-Number) of 57.2. The first surface of the eyepiece's first element (58) is aspheric having a conic constant coefficient of −12.1562.

| Lens | Surface | Radius (mm) | Thickness (mm) | Medium |
|---|---|---|---|---|
| Binocular Objective | 1 | 54.82810073 | 2.00000000 | Acrylic |
| | 2 | 200.00000000 | 151.07000000 | Air |
| Intermediate Image (Field Stop) | 3 | 0.00000000 | 32.00000000 | Air |

-continued

| Lens | Surface | Radius (mm) | Thickness (mm) | Medium |
|---|---|---|---|---|
| First Eyepiece Lens | 4 | 50.00000000* | 5.00000000 | Acrylic |
| | 5 | −36.63804602 | 19.40000000 | Air |
| Second Eyepiece Lens | 6 | 15.0000.0000 | 2.50000000 | Acrylic |
| | 7 | 17.01080006 | 25.67364647 | Air |

*aspheric of form where the SAG is given by:

$$\frac{C(Y^2 + Z^2)}{1 + \sqrt{-(CC+1)C^2(Y^2+Z^2)}};$$

where the conic constant is CC.

Focus adjustment and vertical and horizontal alignment of the left and right optical trains of the device are preferably accomplished in the following manner. By design, the binoculars are set to focus infinite objects within the range between infinity and approximately two meters to avoid the extreme possibility of a defocus condition due to undesirable tolerance buildups for objects at infinity. Accordingly, appropriate targets (nearly collimated) corresponding to the design distance are presented to each objective 60, and the focus of each is adjusted for conformance with specification by sliding the objectives along their respective optical axes until the desired degree of focus has been achieved. This is accomplished by first snap fitting an objective lens 60 in a molded mount 96 (see FIG. 5) which in turn is slidably mounted in a lens assembly (optical support 44, 46) tube that has been injection molded with complementary structure for receiving the optical elements that have corresponding snap fit features.

To achieve vertical and horizontal alignment the preferred sequence is to nominally align one optical train of the device, either left or right, with the other by use assembly fixtures and, if necessary, through the additional use of mirror adjustments. To achieve mirror adjustment, plane stationary mirrors 62 and 66 are preferably mounted via three point mount systems in which two of the three points is provided in the form of bosses molded into the lens housing assemblies with the third point being provided by an adjustment screw to vary the tilt of the mirror plane (see FIG. 6). The boss 66a for mirror 66 is shown in FIG. 5. A similar boss (not depicted) is provided for mirror 62.

Device 20 incorporates several improvements over traditional stereoscopes as represented by the viewer of U.S. Pat. No. 2,511,334, referred to above. Initially, the rotatable mirror assembly 68 reflects or (by reflection) "folds" the viewer's lines of sight passing through the eye openings 27 and eye and field lenses 56, 58 of each lens set from the horizonal direction upwardly through the upper side of the housing 22 to the viewing locations provided the stacked window openings 30c, 34c, 36a. The stacked windows permit ambient light falling on the upper side of the device 20 to enter the housing 22 through the upper side. This makes the device 20 easier to use as a stereoscopic viewer, for example, outdoors and indoors with overhead lighting. The device 20 is also relatively easy to use as a stereoscopic viewer with low positioned lighting sources, such as table lamps, as it is relatively easy for the user to point the device 20 down in front of or under such a low light source. Also, it is believed it is easier and more comfortable for most users to use the device 20 pointing down rather than up as was necessary with prior stereoscopic viewers when used with overhead lighting.

To use the binocular feature the flip mirror assembly 68 is rotated to point the mirror(s) 72 generally downwardly and to reflect (or "fold" by reflection) down onto the first stationary plane mirror 62 on each optic support 44, 46, the lines of sight coming straight through the eye openings 27 and the eye and field lenses 56, 58 of each optic support 44, 46. The lines of sight are, in turn, reflected or "folded" from mirror 62 off mirror 64 and mirror 66 through the objective lens 60 on each optic support 44, 46. The three mirrors, 62, 64 and 66 and objective lenses 60 are located in a plane below the eye and field lenses 56, 58 and the flip mirror 72. The folding provided by the mirrors 72, 62, 64 and 66 permits the length of the housing 22 between the opposing viewing and objective ends 22a, 22b to be somewhat shorter than it might otherwise be if all three lenses on each optic support were mounted in a straight line train.

Adjustable, interpupillary spacing of the two sets of lenses mounted on the pair of optic supports 44, 46 is provided by the cam 78 and adjustment wheel 80. As the adjustment wheel 80 is rotated to move the cam 78 towards the viewing end 22a of the housing 22, the spacing between the tapering sides 78a, 78b which contact corners of the optic supports 44, 46 increases and causes the optic supports 44, 46 and their sets of lenses to spread apart. When the cam 78 is moved away from the eyepiece end, spring 52 pulls the optic supports 44, 46 closer together. The eye openings 27 through the eyepiece end caps 26 as well as the objective lens openings through objective end caps 82 at the opposite and of the housing 22 are either oversized circular or generally elliptical to permit continued viewing through the lenses during lateral movement of the supports 44, 46 without interference by the housing. The flip mirror(s) 72 is (are) sufficiently wide so that lines of sight from the eye and field lenses 56, 58 are folded upwardly and in optical alignment with and through the various windows openings 30c, 36c and 38. In the stereoscope mode of operation, the interpupillary distance is automatically set and this feature in combination with the large planar surface of mirror 72 and the prior alignment procedures makes it unnecessary to adjust for lateral alignment between the eyepieces (54) and the stereo image pairs (94a, 94a').

While a preferred embodiment device 20 has been disclosed, it should be appreciated that the device 20 could be varied in numerous ways including the deletion of some of its features. For example, Galilean telescope forms could be used provided positive power is added to the eye lens by introducing a positive lens to the system when the "flip" mirror is set to view the stereo pairs since a Galilean's eye lens is ordinarily negative whereby an observer would not be able to focus on the stereo pairs. Other forms of eyepieces may also be usefully employed with one or more components placed proximate the intermediate image. In addition, more complex forms may be used for the binocular objectives for enhanced performance. Also, while a unified rotatable mirror assembly 68 is disclosed, it will be appreciated that two mirrors, separately movably mounted in the housing, might be used instead. The two mirrors could be operably coupled to the same manual actuator or each separately coupled with a separate manual actuator. Also, prisms might be substituted for mirrors. The spacing of the optic supports 44, 46 may be controlled in other ways known to adjust interpupillary spacing. The position of the advance lever 36 and anti-rotation member 38 can be reversed and the anti-rotation member 38 replaced by smaller members (e.g. leaf springs) mounted directly to or formed in the circular boss 30a. The stereoscopic images can be provided on rectangular cards instead of circular reels or on separate strips or generated electronically instead of through illuminated photo transparencies. Thus, the viewing locations may be windows through the housing as described above or a pair of electronic screens (or one long screen) within the housing. One or more different biasing members might be used for tension spring 52.

It should be noted that while the optical axes of the binocular objectives and those of the eyepieces are vertically offset to provide a device architecture in which the circular reel resides advantageously in a plane that is nominally parallel to both to take advantage of overhead lighting and achieve compactness, there are other geometric architectures that are possible in which the circular reel may be at some other oblique angle or other orientation.

It will be appreciated by those skilled in the art that still other changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A convertible binocular/stereoscope device comprising:
   a housing;
   two sets of lenses within the housing, each set including
      a plurality of lenses spaced and arranged to form two, side-by-side telescope lens trains extending longitudinally between opposite ends of the housing,
      a pair of eye openings through the housing at one of the two opposite ends, each eye opening adjoining and being aligned with a lens of a separate one of the two sets of lenses, the pair of eye openings collectively providing two lines of sight into the housing and through the two sets of lenses; and
      a mirror assembly in the housing movably supported to permit selective deflection of the line of sight from each eye opening away from the lenses of each set longitudinally downstream from the mirror assembly and to a pair of viewing locations on a side of the housing located longitudinally between the opposite ends.

2. The convertible binocular/stereoscope device according to claim 1 wherein the pair of viewing locations are provided by a pair of window openings through the side of the housing, the pair of window openings admitting light incident on the side of the housing into the housing.

3. The convertible binocular/stereoscope device according to claim 1 wherein each telescopic lens train includes an objective lens at an objective end of the housing, an eye lens at a viewing end of the housing adjoining one of the pair of eye openings and a field lens located longitudinally between the objective lens and the eye lens and wherein the mirror assembly is located longitudinally within the housing between the objective lens and the field lens of each of the two sets of lenses.

4. The convertible binocular/stereoscope device according to claim 1 wherein the mirror assembly is mounted so as to rotate through an arc of about ninety degrees, centered about the lines of sight extending through the pair of eye openings and the lenses aligned with the pair of eye openings.

5. The convertible binocular/stereoscope device according to claim 1 further comprising a pair of optic supports, each support supporting the lenses of one of the two sets, the pair of optic supports being positioned side-by-side within the housing and mounted for lateral movement toward and away from one another.

6. The convertible binocular/stereoscope device according to claim 5 wherein the mirror assembly is mounted so as to rotate through an arc of about ninety degrees centered about the lines of sight extending perpendicularly through the pair of eye openings, the mirror assembly directing the lines of sight to the pair of viewing location at one end of the arc and at the other end of the arc directing the lines of sight to additional mirrors located on the optic supports, the additional mirrors directing the line of sight from the mirror assembly to the objective lenses of the two sets.

7. The convertible binocular/stereoscope device of claim 1 further comprising
- a pair of optic supports, each support supporting a separate one of the two sets of lenses, the pair of optic supports being positioned side-by-side for lateral movement towards and away from one another;
- a cam movably mounted between the two optic supports, sides of the cam being in respective contact with the two optic supports and spacing between the sides of the cam in contact with the optic supports varying progressively along the cam; and
- a manual actuator operably coupled with the cam so as to move the cam between the two optic supports and thereby adjust lateral spacing between the two optic supports.

8. The convertible binocular/stereoscope device according to claim 7, wherein the manual actuator is a wheel and the optical device further comprises a pinion coupled to the wheel for rotation and a rack extending longitudinally on the cam and in engagement with the pinion.

9. The convertible binocular/stereoscope device according to claim 7 wherein the set of lenses supported on each optic support define at least one of a telescopic lens train and a positive eyepiece magnifying lens train.

10. The convertible binocular/stereoscope device according to claim 7 further comprising at least one spring biasing at least one of the pair of optic supports towards a remaining one of the pair of optic supports.

11. The convertible binocular/stereoscope device of claim 1 further comprising:
- a housing;
- a first pair of lenses, one from each set, positioned side-by-side in the housing;
- a pair of eye openings through a viewing side of the housing, each eye opening adjoining and being aligned with a separate one of the first pair of lenses to provide separate, side-by-side lines of sight straight through the first pair of lenses;
- a reel advance lever mounted to pivot on another side of the housing adjoining the viewing side between first and second positions, the reel advance lever having a pair of window openings therethrough aligned with and overlapping one another in the first position of the reel advance lever; and
- the mirror assembly being mounted in the housing so as to fold the lines of sight downstream from the first pair of lenses through the window openings of the housing and the reel advance lever.

12. The convertible binocular/stereoscope device according to claim 11, wherein a slot is provided on the other side of the viewer and is configured to receive a circular reel in contact with the advance lever.

13. The convertible binocular/stereoscope device of claim 11 further comprising second and third pairs of lenses of the two sets positioned within the housing.

14. The convertible binocular/stereoscope device according to claim 11 further comprising a pair of optical supports, each of the optical supports mounting a separate one of the first set of lenses, the pair of optical supports being mounted side-by-side in the housing for lateral movement towards and away from one another.

15. An optical device convertible between binocular and stereoscope modes of operation, said optical device comprising:
- objective lens means for forming a pair of laterally separated real, intermediate images of an object at predetermined distances behind said objective lens means corresponding to left and right eye binocular views;
- a pair of eyepieces of net positive power for viewing said intermediate images at said predetermined distances;
- parallel adjoining view positions for a stereoscopic pair of images at a predetermined location with respect to said eyepieces, said predetermined location corresponding to the distance between said eyepieces and said intermediate images; and
- a plurality of mirrors located between said objective lens means and said eyepieces for inverting and reverting the orientation of said intermediate images from said objective lens means so that said intermediate images appear properly oriented when viewed by said eyepieces and for redirecting the line of sight through said eyepieces so that an observer can selectively view said intermediate images and said stereo pairs.

* * * * *